Sept. 17, 1940.  O. R. BOOTH  2,215,028
MOUSE OR RAT TRAP
Filed March 27, 1939
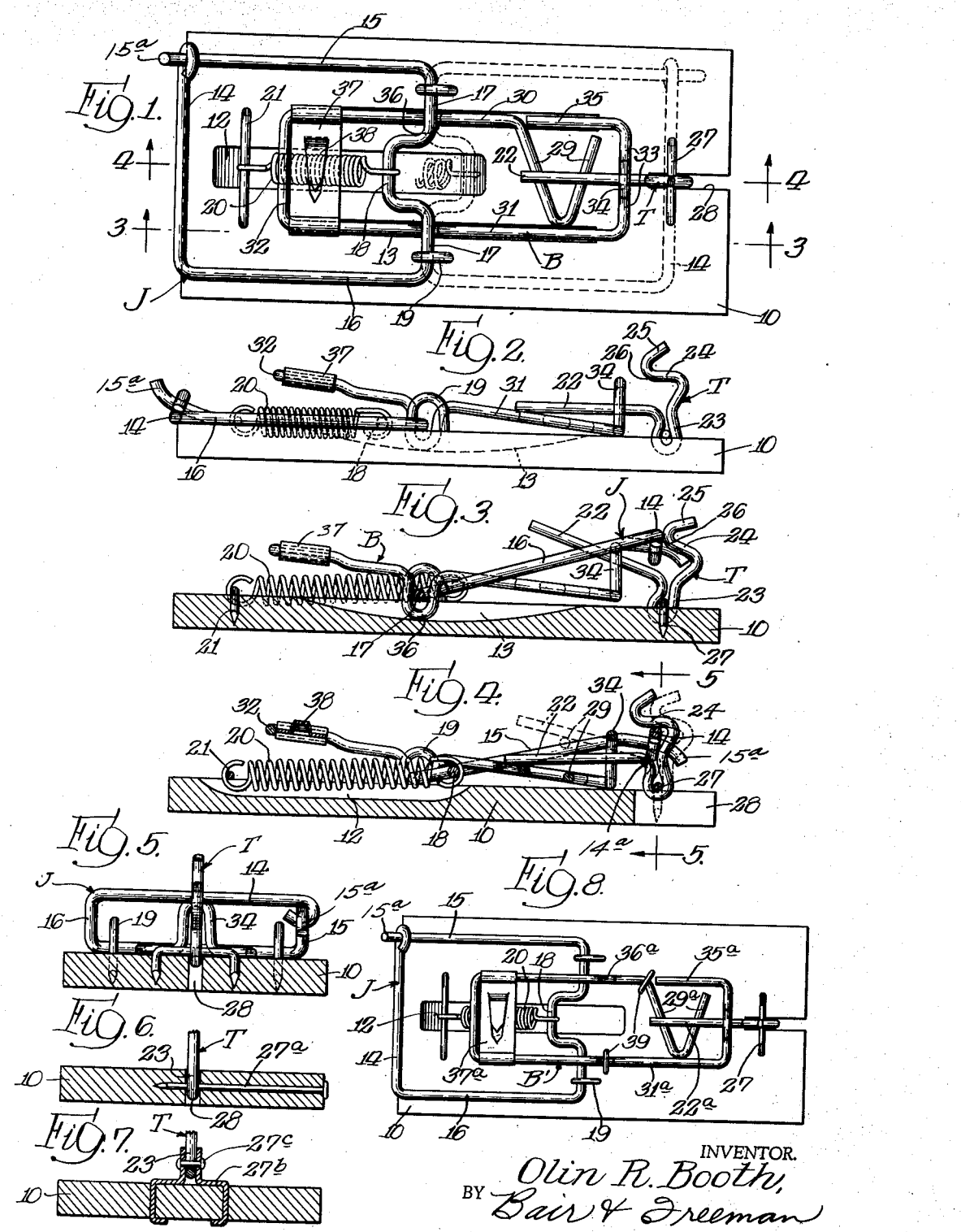
INVENTOR.
Olin R. Booth,
BY Bair & Freeman
ATTORNEYS.

Patented Sept. 17, 1940

2,215,028

UNITED STATES PATENT OFFICE 2,215,028

MOUSE OR RAT TRAP

Olin R. Booth, Cainsville, Mo.

Application March 27, 1939, Serial No. 264,419

11 Claims. (Cl. 43—83.5)

An object of my invention is to provide a trap which can be made of suitable size for trapping either mice or rats or other animals if desired, the trap being relatively inexpensive to manufacture and rugged enough to withstand much use and abuse, yet which is capable of outlasting most of the present forms of traps due to certain features of construction which will be pointed out in connection with my invention.

A further object is to provide a trap which requires merely the swinging of the jaw from gripping or tripped position to set position without the necessity of manipulating the trigger or bait bar, the trap being so designed that it is a perfect self demonstrator.

A further object is to improve the spring construction of traps by using a tension spring so associated with the jaw of the trap that strain on the staples that serve as a pivoting means for the jaw is minimized and the tension of the spring causing the jaw to engage its trigger is greatly reduced at the set position of the trap to increase its sensitivity to slight pressure exerted against the bait bar of the trap.

Another object is to provide a trap which has a self setting trigger arrangement in which the trigger has great leeway for bending of the parts during many uses of the trap with the original sensitivity of the trap substantially maintained throughout the life thereof.

Another object is to provide a trap in which the jaw may tightly engage the base throughout the extent of the jaw so that there is no possibility of the animal escaping from the trap regardless of whether the end or sides of the jaw engage the animal.

Another object is to provide a trap which can be easily set without the necessity of manipulating any finely adjusted elements thereof and can then be carried safely without any danger of tripping the trap while being carried to the place of deposit whereupon the trap may be set down still without any danger of its tripping due to the possibility of retaining the jaw in set position under the fingers of the operator, the parts being so designed and arranged that when the jaw is then released, the operator is assured of the trap being properly set without further attention.

Other objects, purposes and characteristics of the present invention will be in part obvious in the accompanying drawing and in part pointed out as the description of the invention proceeds.

In describing the invention in detail reference will be made to the accompanying drawing in which like reference characters designate corresponding parts throughout the several views and in which:

Figure 1 is a plan view of the trap embodying my invention and showing by dotted lines the jaw swung to set position.

Figure 2 is a side elevation of the trap.

Figure 3 is a sectional view on the line 3—3 of Figure 1 showing the jaw being swung to set position.

Figure 4 is a sectional view on the line 4—4 of Figure 1 showing the jaw in set position and by dotted lines showing the trap being tripped.

Figure 5 is a sectional view on the line 5—5 of Figure 4 showing details of the trigger arrangement.

Figures 6 and 7 are similar sectional views showing modified constructions; and

Figure 8 is a plan view of a modified form of trap.

On the accompanying drawing I have used the reference numeral 10 to indicate a base. The base 10 may be made of wood or the like and is provided with a central groove 12 and a pair of grooves 13 spaced on opposite sides of the central groove.

A jaw J is provided comprising a wire bent to form a gripping portion 14, a pair of side portions 15 and 16, pivot portions 17 and an arm portion 18 between them. The pivot portions 17 lie on the base 10 and staples 19 are driven into the base over them to retain them in a definite position with relation to the base and permit pivotal movement of the portions 17.

A spring 20 is provided for the jaw J. The spring 20 is a tension spring having one end anchored to the base 10 by means of a staple 21 and its other end connected to the arm 18. The arm 18 extends towards the gripping portion 14 of the jaw J and the staple 21 is located adjacent the gripping end of the base 10. This permits the spring to assume a position adjacent dead center when the jaw is in the set position of Figure 4 so that there is very little lifting movement on the jaw while in set position. Whenever the jaw is released, however, the spring 20 swings the jaw upwardly and the leverage of the arm 18 increases as the spring contracts thus giving a quick and strong throw to the jaw and a final tight closure of the jaw against the base 10 in the tripped position of Figure 2. The spring, it will be noted, tends to keep the pivot portions 17 adjacent the base 10 thus eliminating any tendency for action of the spring to pull the staples 19 upwardly out of the base 10 as in the usual type of trap having a coiled spring around the pivot portions 17.

A trigger T is provided for the jaw J. The trigger T includes a tail 22, a pivot loop 23, a hook portion 24 and an inclined setting portion 25. A rounded edge is provided at 26 between the portions 24 and 25. A staple 27 extends through the pivot loop 23 and serves to pivotally mount the trigger T relative to the base 10. A slot 28 is provided in the base to receive a portion of the loop 23 to aid in keeping the trigger T in upright position.

A bait bar B is provided comprising a wire bent to provide a pair of counter-weight portions 29, a pair of sides 30 and 31, a pair of cross members 32 and 33, a loop 34 and a terminal end 35. The side portions 30 and 31 are each provided with a pivot loop 36 extending under the pivot portion 17 of the jaw J and located in the slots 13. The slots serve as a means to prevent lateral movement of the bait bar B relative to the base 10 and permit the pivot loops 36 to extend under the pivot portions 17. The loop 34 extends over the trigger 22 and aids in keeping the trigger T in upright position.

A bait support 37 is formed of a strip of sheet metal having a bait holding tongue 38 struck upwardly therefrom. The bait support 37 forms in effect a pan for the bait. When the bait is pressed under the tongue 38 it not only will lodge thereunder but will spread out all over the metal and lodge against the portion of the metal surrounding the wire 32. My bait support will accordingly hold five or six times more bait than an ordinary trap, thus effecting a greater attraction for the mouse.

In Figure 6 I show a modified construction in which a nail 27a serves as a substitute for the pintle staple 27 provided in Figure 5. The slot 28 thereby receives the pivot loop 23 of the trigger in a manner to more effectively permit the slot to hold the trigger in upright position.

In Figure 7 I show another modified construction in which a pair of sheet metal strips 27b extend upwardly from the base 10 and carry a rivet 27c to serve as a pintle for the trigger T. The straps 27b extend along the sides of the pivot loop 23 substantial distances from the pintle 27c in order to limit the trigger against falling sidewise.

In Figure 8 I show a modified construction in which the bait bar B' is somewhat different from what is illustrated in Figure 1. The elements of the bait bar have the same reference characters with the addition of a. The loops 36a rest on top of the base 10 at a point beside instead of under the pivot portions 17 of the jaw J. A pair of staples 39 serve to retain the bait bar B' in position, these staples taking the place of the grooves 13 and the pivot portions 17 of the jaw in Figure 1.

*Practical operation*

When anyone picks up my trap, without knowing in advance how to operate it, he will naturally throw the jaw J from the position of Figure 2 to the position of Figure 4. The side member 15, it will be noted, has an extension 15a which serves as a stop to keep the jaw from coming on down over center of the spring 20. As the jaw is pulled back it is obvious that if the jaw came too near the board the pull of the spring would be on the wrong side of center to throw the jaw when the trigger is released. In pulling the jaw back, the operator will observe that the trigger T will move to the position of Figure 3 and then drop to set position shown by solid lines in Figure 4 without the necessity of any manipulation of the trigger or bait bar on his part. It is therefore obvious that my trap is clearly a self demonstrator.

When the trap is level or tipped back somewhat, the weight of the trigger tail 22 will pull the trigger over the jaw to the position of Figure 4, whereas if the trap is tripped back too far the weight of the trigger tail will be insufficient for this purpose. This deficiency, however, is overcome by the fact that the cross member 14 of the jaw J will eventually strike the point 14a (see Figure 4) on the trigger tail 22 and thus positively throw the trigger over the jaw. This makes it possible to set the trap when it is held in almost any position.

When the jaw is released, the hook portion 24 of the trigger T will engage the gripping portion 14 of the jaw as shown in Figure 4 and the hook portion, it will be noted, is approximately at right angles to a line between the center of the pivot staple 27 and the center of the jaw element 14. It is therefore obvious that it will take very little pressure to swing the trigger to the dotted position of Figure 4 where the rounded part 26 permits the jaw to swing towards tripped position and the jaw tends to move the trigger out of the way for this purpose. Also, since the spring 20 is adjacent dead center in the position of Figure 4 there is very little pressure of the jaw against the trigger hook 24 and therefore only slight pressure will be necessary on the bait holder 37 to effect tripping of the trap.

It will also be noted that the rearmost of the two elements 29 of the bait bar B engages the tail 22 substantially spaced from the pintle 27 as shown by dotted lines in Figure 4 thus giving additional leverage to make the tripping of the trigger relatively easy.

When the jaw is released from the trigger T, it will be quickly and forcefully swung toward the tripped position of Figure 2 and the elements 14, 15 and 16 of the jaw will tend to grip the base 10 tightly, thereby catching any part of the animal that might be located between these elements and the base at the time the jaw closes. Most of the elements of the trap may be inexpensively formed of wire and assembled without necessity for fine adjustment or extremely accurate positioning of the parts. An ordinary jig for positioning the parts may be provided for assembly operations and after the traps are assembled there is assurance that each one of them will work without further adjustment due to the possible leeway in dimensions peculiar to a trap of the design disclosed.

A trap of the kind here shown will stand lots of abuse for a long period of time and still work perfectly after each setting. Strains tending to pull staples out of the base and to bend different parts of the trap from their original positions are all minimized with a trap of the construction disclosed.

In accordance with the provisions of the patent statutes I have described the principle of operation of my invention together with illustrations of a preferred embodiment and slight modifications thereof which are shown merely by way of illustration. I desire that it be understood that the structure disclosed is only illustrative and that the invention may be carried out by other means within the scope of the appended claims.

What I claim as new and desire to secure by Letters Patent of the United States is:

1. In a mouse or rat trap, a base, a jaw having pivot portions, staples over said pivot portions and into said base, said jaw having an arm portion between said staples extending toward the gripping portion of the jaw, a tension spring having one end connected with said base adjacent the gripping end thereof with said spring, arm portion and pivot portions substantially in alignment when said jaw is closed, a trigger adjacent the other end of said base and a bait bar coacting with said trigger.

2. In a trap structure, a base, a jaw having pivot portions pivoted to said base, said jaw having an arm portion extending away from said pivot portions and toward the gripping portion of the jaw, a tension spring having one end connected with said base adjacent the gripping end thereof, a trigger adjacent the other end of said base and a bait bar coacting with said trigger, said arm being arranged to position said spring, said arm portion and said pivot portions in alignment when said jaw is swung to closed position and adjacent dead center when said jaw is swung to position coacting with said trigger.

3. In a trap of the character described, a base, a jaw pivoted thereto and having an arm extending from the pivot axis, a tension spring connected with said arm and arranged relative thereto so as to swing the jaw away from setting and toward gripping position, a trigger for said jaw in the set position thereof, said spring being adjacent dead center when said jaw coacts with said trigger, said trigger comprising a tail at one of its ends and a hook at the other end thereof, a pintle extending through said trigger and supported by said base, means coacting with said trigger to limit sidewise dropping thereof toward said base, said means being closely adjacent the sides of said trigger, said hook having an inclined setting portion adapted to be engaged by said jaw when swung to set position and operable to swing the trigger to a position permitting the jaw to engage under the hook of the trigger, the weight of said tail being effective to return said hook to position for retaining said jaw in set position, said hook portion being at substantially right angles to a line between said pintle and the portion of the jaw engaged by the hook end and a bait bar coacting with said tail and adapted to lift it when the bait carrying end of the bait bar is depressed.

4. In a trap of the character described, a base, a jaw pivoted thereto and having an arm extending from the pivot axis, a tension spring connected with said arm and arranged relative thereto so as to swing the jaw away from setting and toward gripping position, a trigger for said jaw in the set position thereof, said trigger having a tail at one end, a pivot loop intermediate its ends and a hook at the other end thereof and a pintle extending through said pivot loop and supported by said base, said hook having an inclined setting portion adapted to be engaged by said jaw when swung to set position and operable to swing the trigger to a position permitting the jaw to engage under the hook of the trigger, the weight of said tail being effective to return said hook to position for retaining said jaw.

5. In a trap, a base, a jaw pivoted thereto, a spring connected with said arm and arranged relative thereto so as to swing the jaw away from setting and toward gripping position, a trigger for said jaw in the set position thereof, said trigger being pivoted to said base, said trigger having a hook and an inclined setting portion adapted to be engaged by said jaw when swung to set position and operable to swing the trigger to a position permitting the jaw to engage under the hook of the trigger, means to return said hook to position for retaining said jaw in set position, said hook portion being at substantially right angles to a line between the pivot of said trigger to said base and the portion of the jaw engaged by the hook end, and a bait bar coacting with said tail and adapted to lift it when the bait carrying end of the bait bar is depressed.

6. In a trap of the kind described, a base, a jaw pivoted thereto, a spring arranged to swing said jaw away from setting and toward gripping position, a trigger for said jaw in the set position thereof, said trigger comprising a wire having a tail at one end, a pivot loop intermediate its ends and a hook at the other end thereof, a pintle extending through said pivot loop and supported by said base, means coacting with said trigger to limit sidewise dropping thereof toward said base, said means being closely adjacent the sides of said trigger and being carried by said base, said hook having an inclined setting portion adapted to be engaged by said jaw when swung to set position and operable to swing the trigger to a position permitting the jaw to engage under the hook of the trigger, the weight of said tail being effective to return said hook to position for retaining said jaw, and a bait bar coacting with said tail to lift it when the bait is disturbed.

7. In a trap of the character described, a base, a jaw pivotally connected thereto and having an arm extending from the pivot axis, a tension spring connected with said arm and arranged relative thereto so as to swing the jaw away from setting and toward gripping position, a trigger for said jaw in the set position thereof, said trigger having a jaw engaging portion and a tail and a bait bar pivoted to said base and cooperating with said trigger to retain it in set position, said bait bar having depressed loops extending under the pivotal connection of said jaw to said base, said base having grooves receiving said depressed loops to position them laterally of said base, said bait bar having an inverted U-shaped portion receiving the tail of said trigger and permitting movement of said tail upwardly therein during setting of the trap.

8. In a trap of the character described, a base, a jaw having pivot portions pivoted thereto, a spring arranged to swing said jaw away from setting and toward gripping position, a trigger for said jaw in the set position thereof, and a bait bar pivoted to said base and cooperating with said trigger to retain it in set position, said bait bar having depressed rocker loops extending under the pivot portions of said jaw and said base having grooves receiving said depressed loops to position them laterally of said base with the lower edges of said loops pivoting against the bottoms of said grooves and the sides of the loops coacting with said pivot portions of said jaw to limit movement of the bait bar longitudinally of said base.

9. In a trap structure, a base, a spring urged jaw pivoted thereto, a wire trigger for said jaw in the set position thereof, a tail on said trigger and a wire bait bar pivoted to said base and having terminal ends cooperating with said trigger, one of said terminal ends cooperating therewith to move the trigger from set position and the other terminal end having an inverted U-shaped portion receiving the tail of said trigger and permitting movement of said tail upwardly therein during setting of the trap.

10. In a trap of the character described, a base, a jaw having pivot portions pivoted thereto and having an arm extending from the pivot axis, a tension spring connected with said arm and arranged relative thereto so as to swing the jaw away from setting and toward gripping position, a trigger for said jaw in the set position thereof, and a bait bar pivoted to said base and cooperating with said trigger to retain it in set position, said bait bar having depressed loops extending under said pivot portions of said jaw, and retained by said pivot portions against displacement from said base and means coacting with said depressed loops to position said bait bar transversely of said base.

11. In a mouse or rat trap, a base, a jaw having a pivot portion pivoted to said base, said jaw having an arm portion extending away from said pivot portion and terminating in a gripping portion of the jaw, a tension spring having one end connected with said base adjacent the gripping end thereof whereby said gripping portion of said jaw, and said gripping end of said base, said spring and said arm portion are all substantially aligned in the closed position of the jaw, and trigger and bait bar mechanism cooperating with said jaw.

OLIN R. BOOTH.